United States Patent
Luu et al.

(10) Patent No.: US 12,513,500 B2
(45) Date of Patent: Dec. 30, 2025

(54) AUGMENTED REALITY-BASED UNKNOWN ADDRESS COMMUNICATION

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 656 days.

(21) Appl. No.: 17/931,636

(22) Filed: Sep. 13, 2022

(65) Prior Publication Data
US 2024/0098472 A1   Mar. 21, 2024

(51) Int. Cl.
| | |
|---|---|
| H04W 4/90 | (2018.01) |
| G06V 40/10 | (2022.01) |
| H04W 4/024 | (2018.01) |
| H04W 4/029 | (2018.01) |

(52) U.S. Cl.
CPC .............. *H04W 4/90* (2018.02); *G06V 40/10* (2022.01); *H04W 4/024* (2018.02); *H04W 4/029* (2018.02)

(58) Field of Classification Search
CPC ................................ H04W 4/90; H04W 4/024
USPC ..................................................... 455/404.2
See application file for complete search history.

(56) References Cited

U.S. PATENT DOCUMENTS

| | | | |
|---|---|---|---|
| 9,444,784 B2* | 9/2016 | Burns | H04L 61/256 |
| 10,142,783 B2* | 11/2018 | Gordon | H04W 4/12 |
| 10,506,373 B2* | 12/2019 | Warren | H04W 4/021 |
| 2009/0163228 A1* | 6/2009 | Blumberg | H04W 4/023 |
| | | | 455/456.3 |
| 2016/0037292 A1* | 2/2016 | King | G08B 25/016 |
| | | | 455/404.2 |
| 2021/0058421 A1* | 2/2021 | Dahlberg | G06F 16/288 |
| 2024/0098472 A1* | 3/2024 | Luu | H04W 4/023 |

* cited by examiner

*Primary Examiner* — Qutbuddin Ghulamali
(74) *Attorney, Agent, or Firm* — Guntin & Gust, PLC; Miyoung Shin

(57) ABSTRACT

The disclosed technology is directed towards facilitating communication with an unknown person via a device of the person having an unknown communications address. The presence of a visible person at a location can be determined, and a communications device at or near that location can be detected as a candidate device associated with that person. The device's current location, which can be regularly registered along with its communication address, is matched to the person's visible location. Communication via the device, such as by a responder, whether with the person and/or to obtain information from the device, is based on the registered communication address. The person's identity and other data may be obtainable. For a non-visible person, e.g., underneath an obstruction, the location of a detected device predicts the likely presence of a person near that location. A map may be generated showing locations of multiple detected devices.

20 Claims, 16 Drawing Sheets

AUGMENTED REALITY-BASED UNKNOWN ADDRESS COMMUNICATION

TECHNICAL FIELD

The subject application relates to the communicating via a device with the communication address determined based on the location of the device, and related embodiments.

BACKGROUND

There are situations in which one person needs to initiate and conduct a communication with another person when the other person's location is known, but that other person is not readily accessible. Indeed, the other person may have a communication device, but the communication address of the device is unknown. One example of such a need is a when a first responder is within a proximity of or otherwise knows the approximate location of a person in need of assistance, but cannot make use of the person's communication device because the identity and device address of the person in need of assistance is unknown to the responder.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
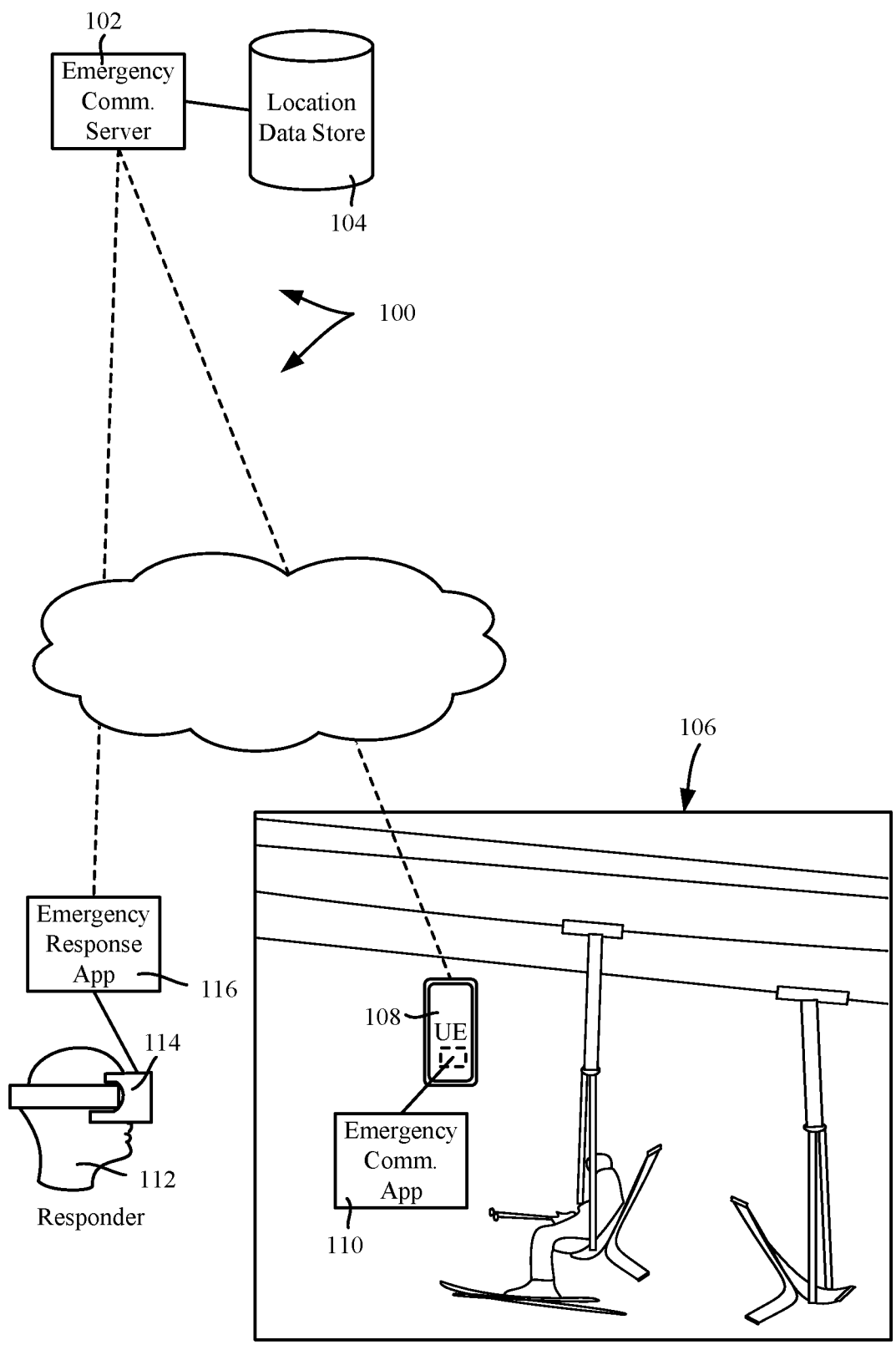
FIG. 1 is a block diagram of an example system and example representation related to communicating with a device of a person in need of assistance, in accordance with various aspects and embodiments of the subject disclosure.

The technology described herein is generally directed towards facilitating an entity (e.g., a first person, which can be a responder) to initiate and conduct a communication with a second person's communication device in real-time when the entity does not have the benefit of an address for a communication device of the second person. In one embodiment, this is accomplished by obtaining a location of the second person, and determining what communication device or devices are at or substantially at the same location and thus are associated with that person, e.g., within a threshold likelihood. The second person may be able to communicate via the device back to the entity, and/or the entity can obtain information relevant to the second person from the communication device or devices.

The technology described herein thus provides a way for a communicating entity to initiate and conduct a communication with a device of another person that is currently inaccessible, even though neither the communication address of that other person's communication device is known in advance, nor is the identity of the other person. An example of this need is a when a first responder is within a proximity of a person in need of assistance; however the technology described herein may be used for other situations as well.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising an emergency communications (comm.) server 102 coupled to a location data store (e.g., database) 104. As described herein and in general, the emergency communications server 102 is configured to facilitate communication with another device based on device address information obtained via the location data store 104 as described herein. Note that one non-limiting example embodiment described herein is that of a first responder communicating with a device of a person, where there is no a priori knowledge of the person's identity or a way to communicate with the device (e.g., phone number or other device address).

Consider by way of example an unknown person equipped with a communication device such as a smart phone, smart watch, and/or other device or devices. The device(s) may have location, camera, and voice/data/video communication capabilities. As shown in the example representation 106 of FIG. 1, the person's device 108 (user equipment, or UE in this example) may also have an emergency communications application program (app) 110.

A responding entity (which may be a responder person such as 112, or non-human responder such as an automated device) may be equipped with an extended (e.g., augmented) reality viewer 114, which can be equipped with a video camera and LIDAR (light detection and ranging) capabilities as well as headphones and a microphone. In this example, the responder's equipment is also location aware, and includes an emergency response application program (app) 116, e.g., incorporated into the augmented reality viewer 114 or coupled thereto via another device. The person's communication device 110 can detect its current location and register the location and device identity in the location data store 104, e.g., periodically. The responding entity's device can also do so.

There are any number of ways in which an incident any be detected and initiated. For example, a responder may come across the person and identify a need to communicate with him or her due to circumstances of the situation. In the example shown in FIGS. 1-10, the person may be waving for assistance or otherwise detected on a stalled ski lift; it is also possible that the ski lift has stalled, whereby help is summoned, knowing that someone is likely on the lift and in need of assistance. Any of a number of other like scenarios may occur. In the example embodiment shown in FIGS. 1-10, described is establishing communication with a person who can be seen by the responder. It may be that the person cannot be seen, but his or her location can be estimated; e.g., a ski lift path's locations are known, as well as the distance between chairs or the like, and thus there are only a limited number of locations that one or more persons in need of assistance can be located.

Figure 2:
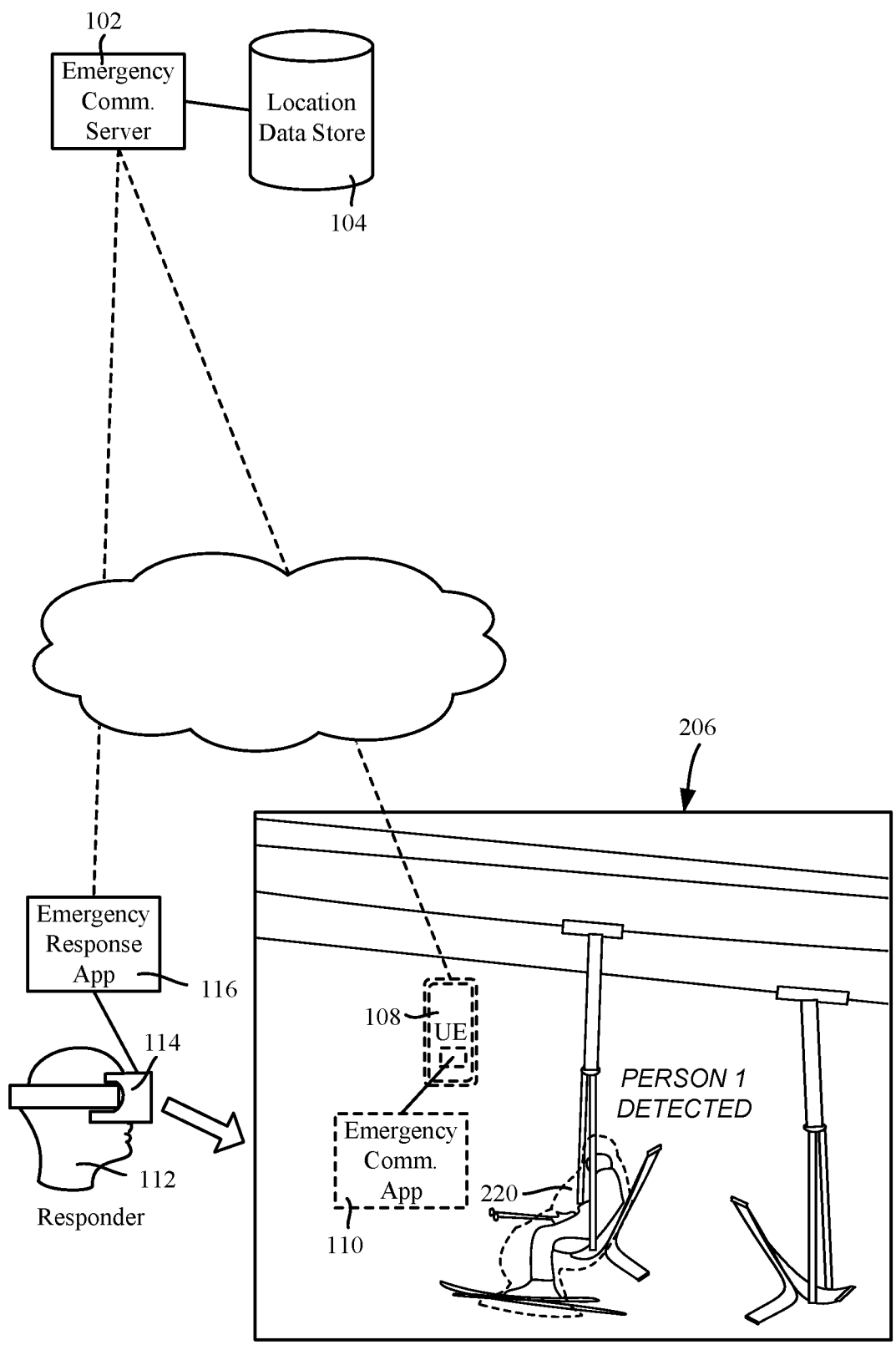
FIG. 2 is a block diagram of an example system and example representation related detecting a person in need of assistance, in accordance with various aspects and embodiments of the subject disclosure.
Figure 3:
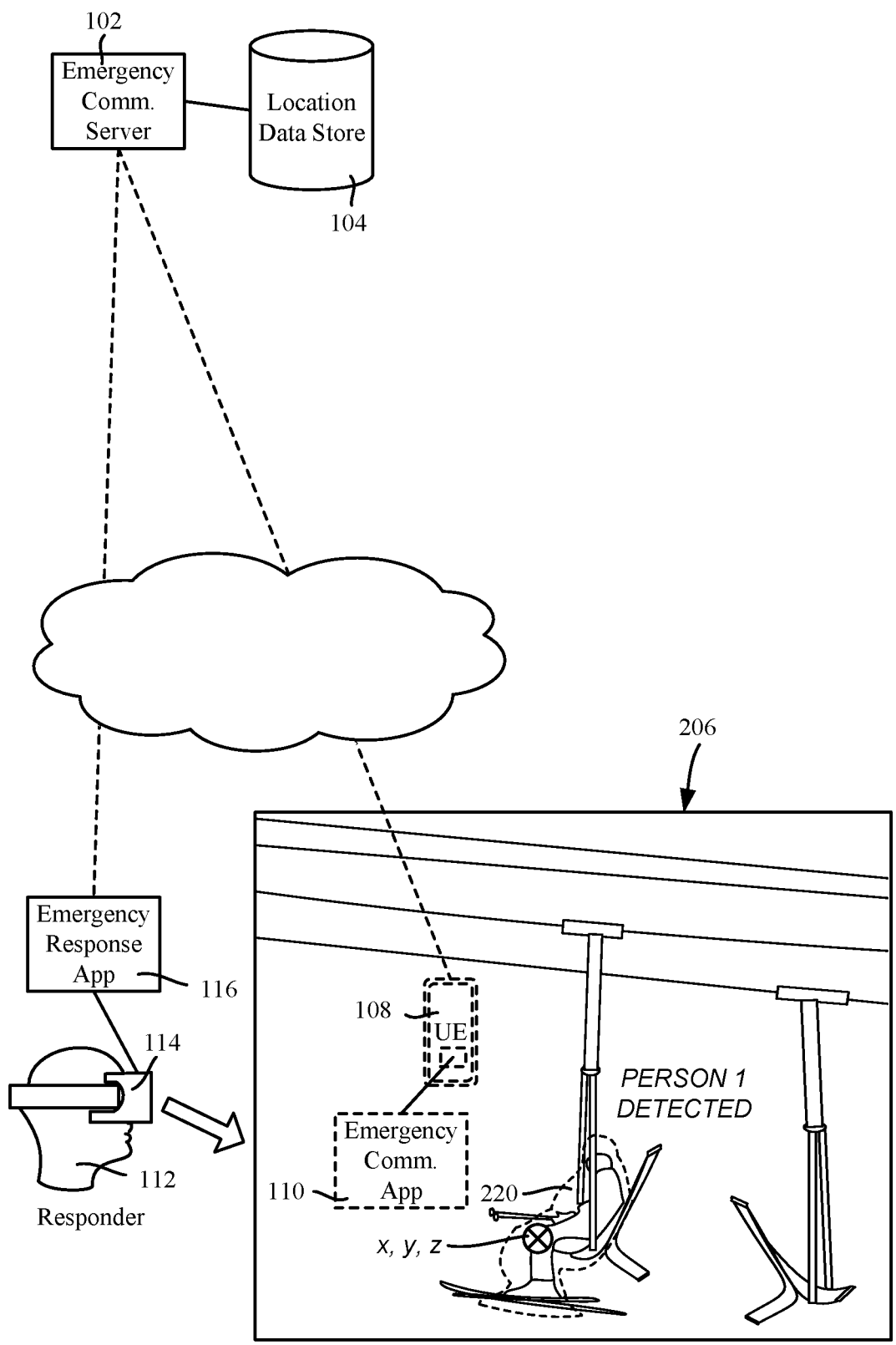
FIG. 3 is a block diagram of an example system and example representation related detecting a location of a person in need of assistance, in accordance with various aspects and embodiments of the subject disclosure.

In the example of FIG. 2, the responder may view the person (victim) using a viewing device, such as the augmented reality viewer 114, as represented by the responder's view 206. Any video captured by the augmented reality viewer 114 may be analyzed by the responder 112, the emergency response app 116, and/or the emergency communications server 102) to detect the presence of a person within the view 206, as represented by the person's dashed outline 220. The outline instead may be color coded, e.g., in a semi-transparent overlay, or highlighted in some other way. Known video and image analysis techniques may be used to detect a person; thermal-based and/or audio sensing also may be used. Note that FIG. 2 shows the UE 108 and emergency communications application 110 as dashed blocks, as not ordinarily visible within the view 206.

Thus, the augmented reality viewer 114 may display to the responder 112 the area/zone view 206 that is representative of the location of the detected person within the video. If more than one person is detected within the view, unique identifiers may be presented for each person—e.g., Person 1, Person 2, and so on. There can also be multiple views for multiple persons, respectively.

Turning to detection of the location of the person, once an area within view is determined to correspond to a person, that same area may be scanned using LIDAR or the like on the viewer 114 to determine the distance and orientation of one or more points in space x, y, z of the location of the person relative to the viewer 114. Because the location of the viewer 114 is known in three dimensions, and the location of the one or more points on the person relative to the viewer are known, the emergency response app 110 can determine the location of one or more points of the person, shown in FIG. 3 as x, y, z coordinates.

Figure 4:
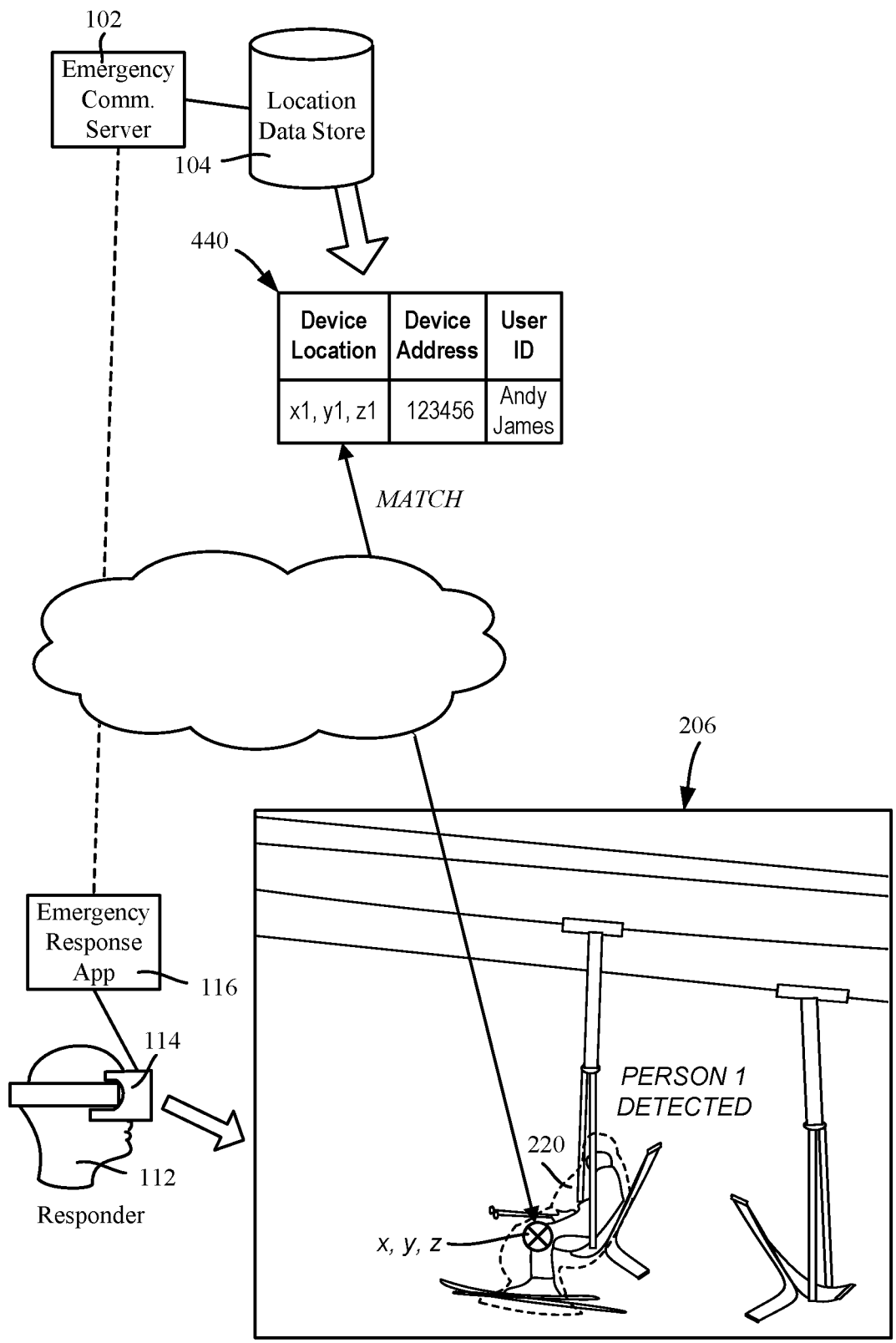
FIG. 4 is a block diagram of an example system and example location data structure containing data related to the location of a person in need of assistance, in accordance with various aspects and embodiments of the subject disclosure.

Once the person's location is known, the emergency response app 110 may send a query to the location data store 104 to determine a match between the location points of the person and any communication devices that may have registered their location at or substantially at the same location coordinates. The match may be shown to exist if a timestamp for the device location registration in the location database 104 matches or approximately matches the present time. In the example of FIG. 4, a match is found, as represented by the entry (e.g., record) in the location data structure 440. The communication address of the device 108 is thus now known to the system 100. Note that a match with a device at a location is not a guarantee of the person also being there; however the device location is a suitable candidate location at which a person is likely present, to within some likelihood criterion. For example, there may be multiple devices near a person, but there is still a good likelihood that one of the devices is a device by which communication with the person can be established. The matching criteria can change, such as to expand a zone near a person until a device is found that is reasonably within range of the person. The matching criteria can also change based on the type of incident; in the ski lift scenario it is likely that the device will closely match the person's location. In contrast, in a disaster scenario such as described with reference to FIG. 11, a victim may be several yards away from his or her device, possibly able to hear from and have speech picked up by the device, as well as communicate signals from wearable devices and the like.

As also represented in the location data structure 440 of FIG. 4, if a device is found to be registered at the location of the unknown person, additional data describing the person associated with the device may be found in user profile data associated with the device registration record. For example, the person may have previously used their emergency communications app 110 or another program to provide data about themselves that would provide assistance to any responder in identifying who the person is and any medical conditions or other information that would be helpful to responders. Still further, additional data may be obtained, for example, from a different data store, such as containing medical records that the person has previously authorized responding entities to use during an incident.

Figure 5:
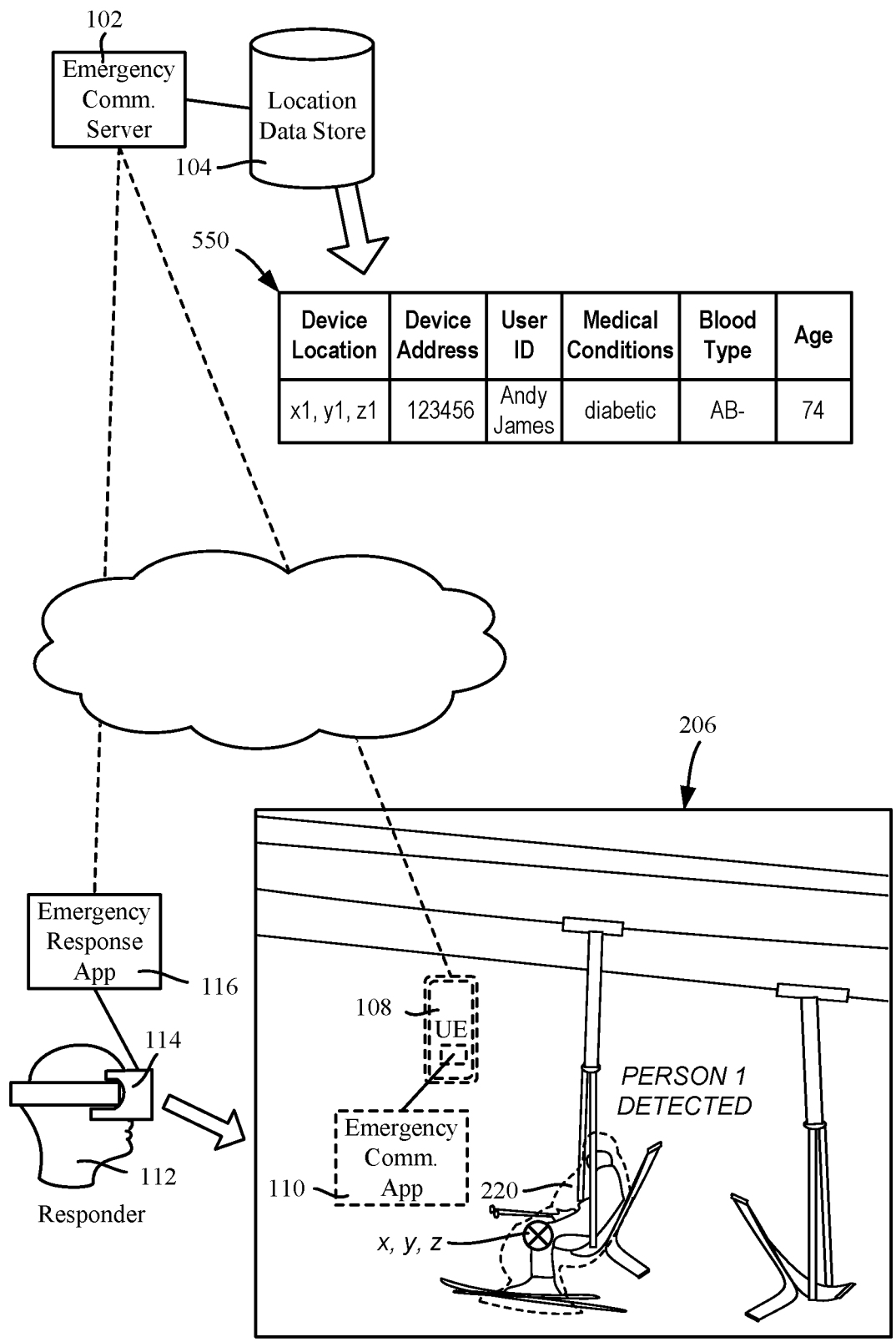
FIG. 5 is a block diagram of an example system and example location data structure containing data related to the location of a person in need of assistance (e.g., a victim) and victim profile data, in accordance with various aspects and embodiments of the subject disclosure.
Figure 6:
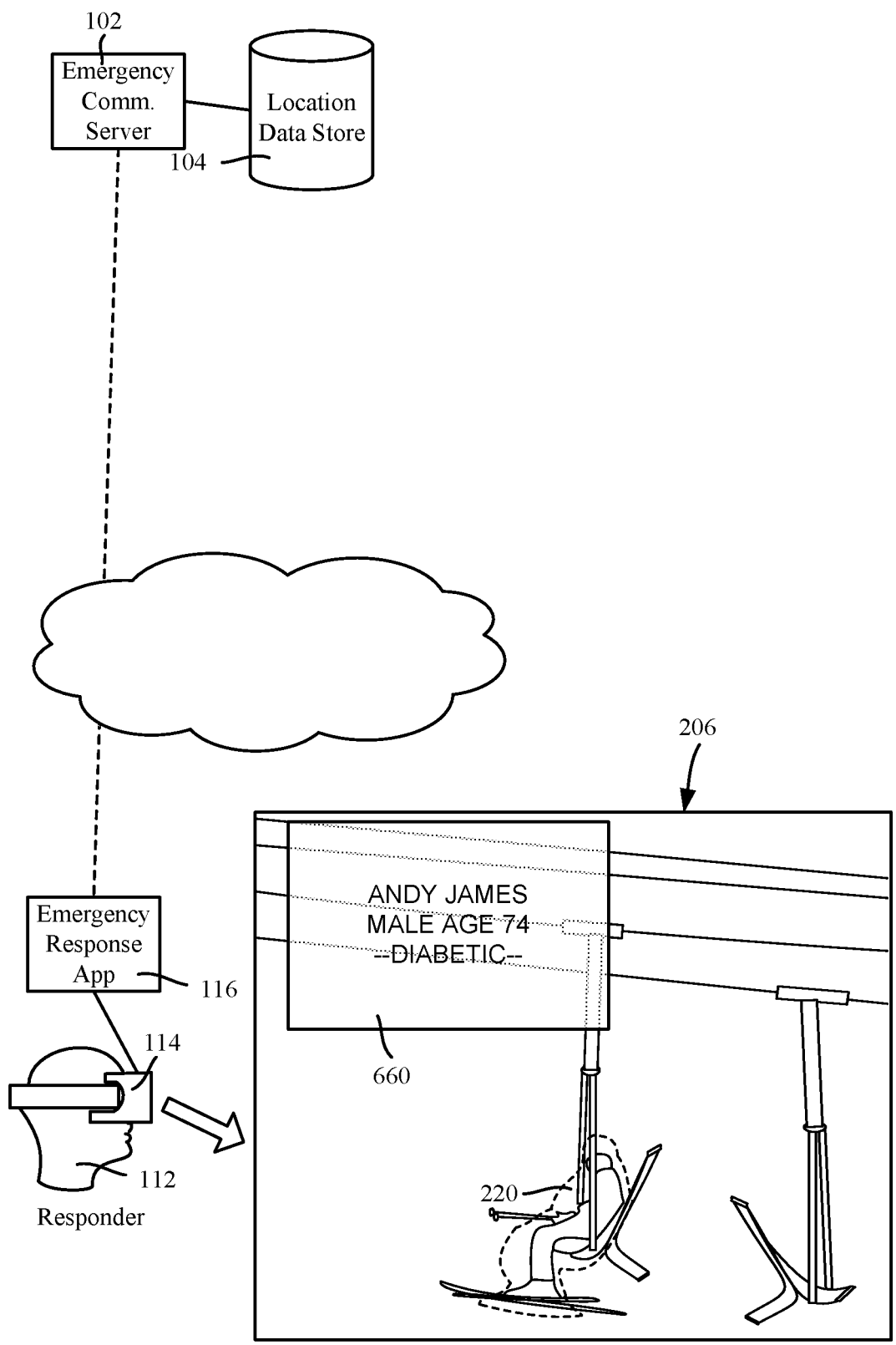
FIG. 6 is a block diagram of an example system and example representation of a view of a responder augmented with victim profile information, in accordance with various aspects and embodiments of the subject disclosure.
Figure 7:
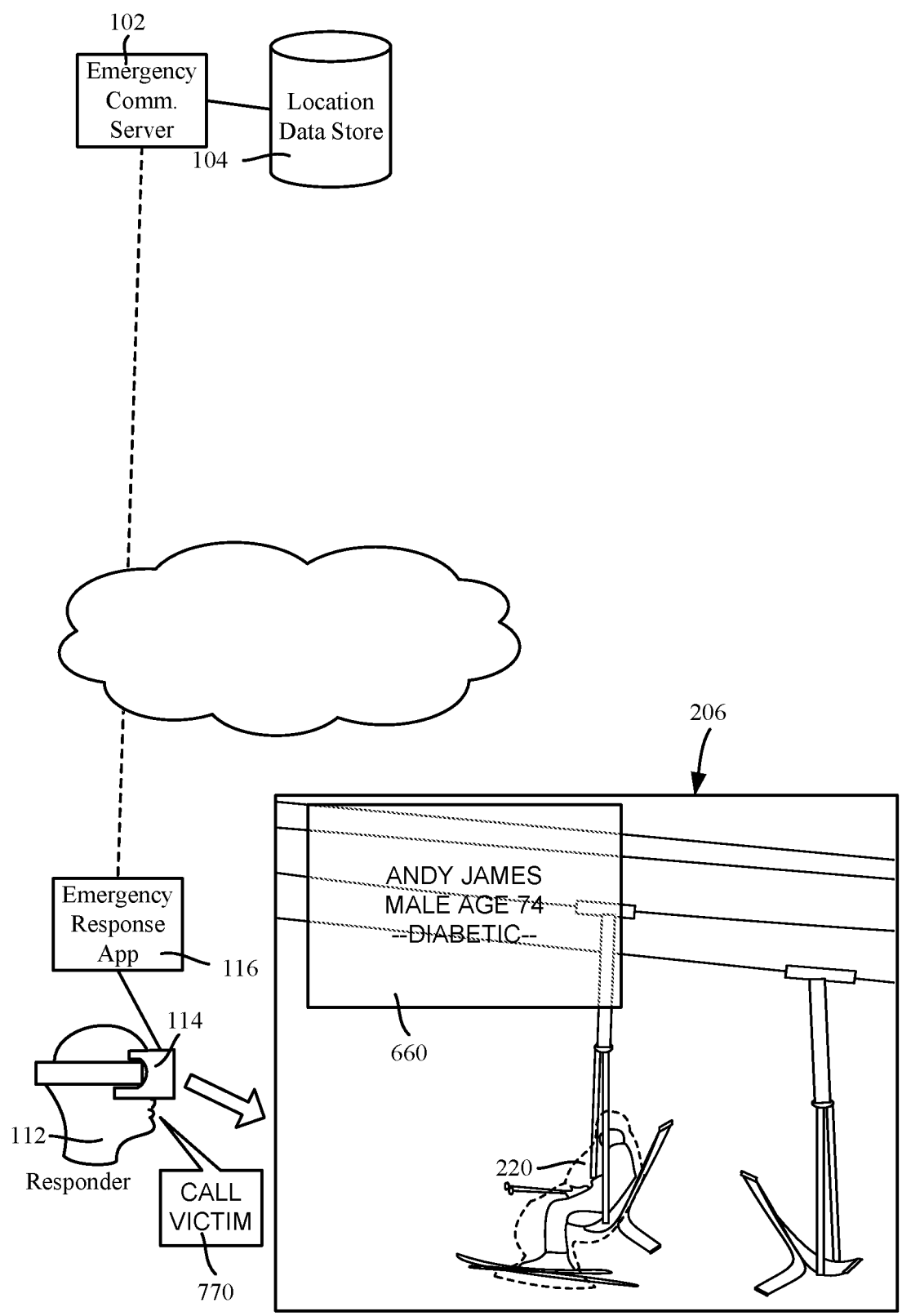
FIG. 7 is a block diagram of an example system and example representation of a responder making a request to communicate with a device of person in need of assistance, in accordance with various aspects and embodiments of the subject disclosure.
Figure 8:
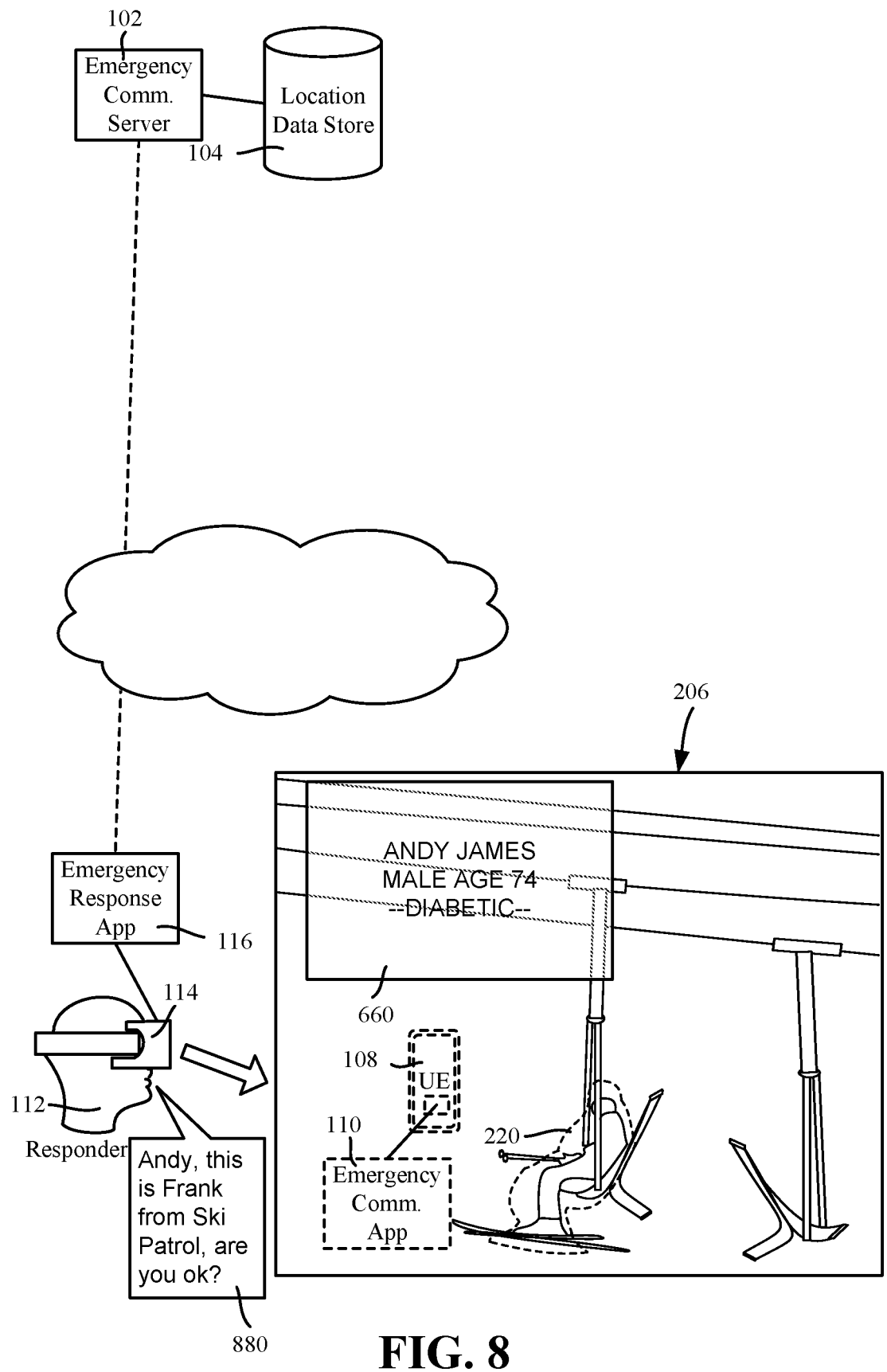
FIG. 8 is a block diagram of an example system and example representation of a responder initiating a communication with communication device(s) of a person in need of assistance, in accordance with various aspects and embodiments of the subject disclosure.
Figure 9:
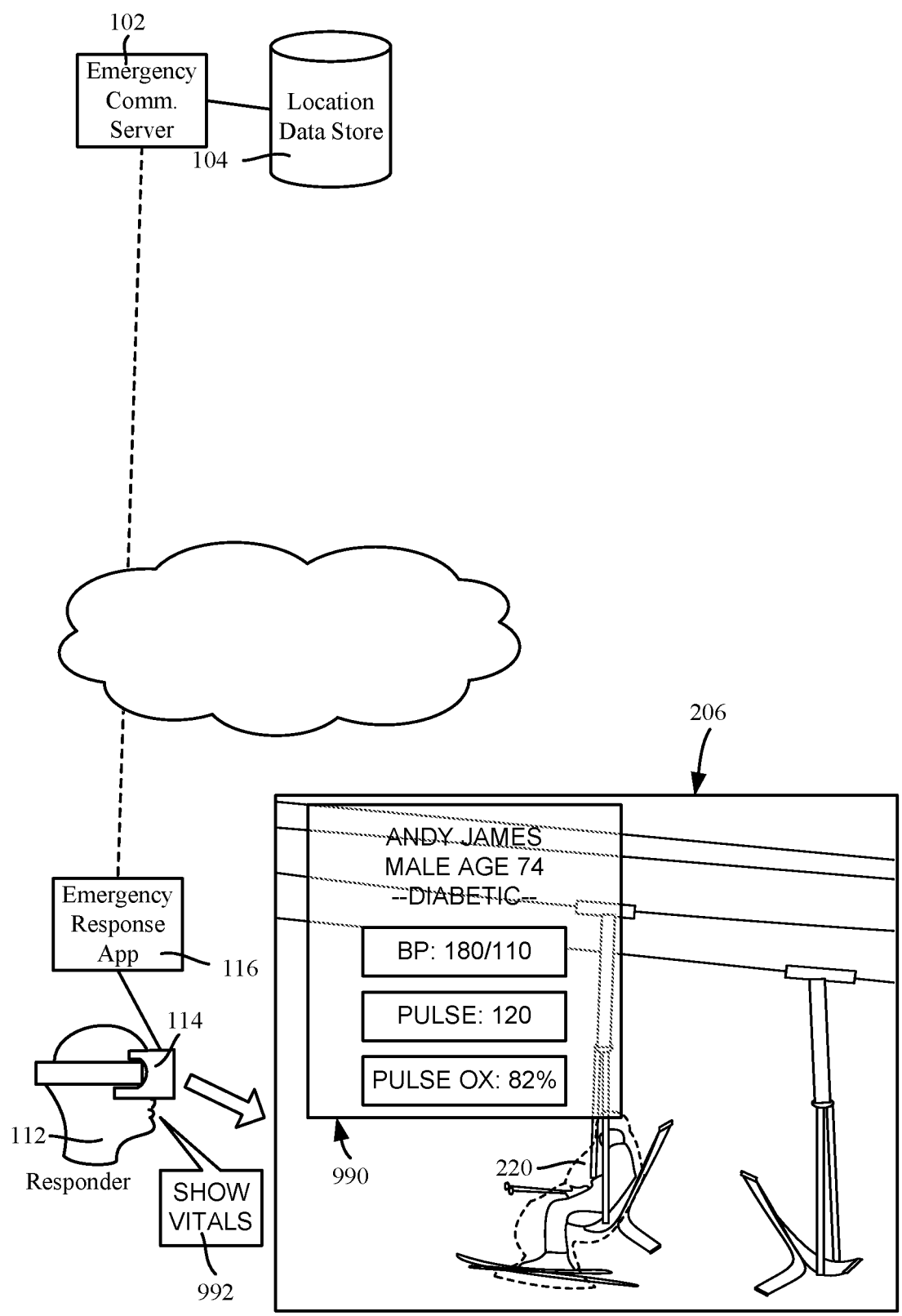
FIG. 9 is a block diagram of an example system and example representation of a view of a responder augmented with medical information related to a victim, in accordance with various aspects and embodiments of the subject disclosure.
Figure 10:
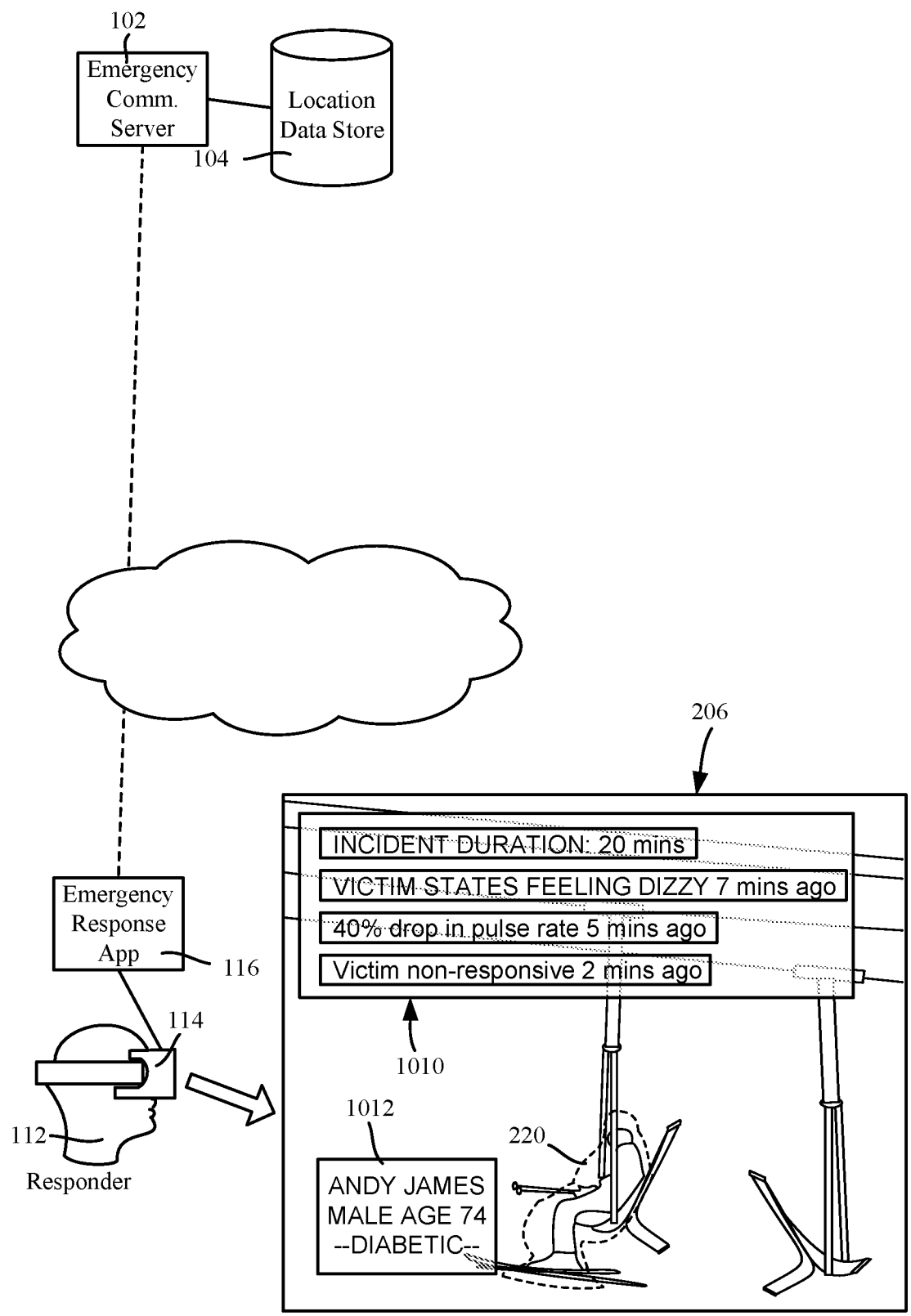
FIG. 10 is a block diagram of an example system and example representation of a view of a responder augmented with summary data related to a victim's device communication with the responder, in accordance with various aspects and embodiments of the subject disclosure.

As shown in the enhanced location data structure 550 of FIG. 5, whatever information is available may be presented to the responder 112, as represented by the augmented overlay display 660 in FIG. 6. In one embodiment, such information is sent from the emergency communications server 102 to the emergency response app 116, which outputs a representation of the data as the augmented reality display 660, and/or as an audio presentation to the responder.

Because the communication address of the person's device is now known, the responder 112 may request the initiation of a communication between himself or herself and the person/victim. The responder 112 may request the communication initiation via spoken command (e.g., as represented by the block 770 of FIG. 7) or in another suitable way, e.g., text command, user interface interaction, and the like. In any event, the emergency response app 116 uses the request to initiate a communication by retrieving the address of the person's device and initiating a communication between the emergency response app 116 and the emergency communications app 110. Alternatively, the communication connection may be a phone call or other (e.g., text) message using a telephone number based on the communication device address.

Once a communication connection is made between the emergency response app 116 and the emergency communication app 110 (or other program of the device 108), the responder 112 may communicate with the person. This may be via spoken dialogue via an audio connection or it may be via a video connection. In any event, a data connection is established between the responder's equipment and the person's device 108. The emergency communication app 110 of the person may be configured so as to automatically initiate a speakerphone-like capability for the victim, so as to enable the victim to be able to communicate with the responder 112 without needing to manipulate the communications device/phone in any way. That is to say, when the responder initiates the communication, he or she may begin speaking (e.g., as shown via block 880 of FIG. 8) directly with the victim without the victim having to do anything.

It may be that the victim is non-responsive, e.g., is unconscious or unable to hear/speak sufficiently loud for the device to pick up the speech. The non-responsiveness, as well as information that can be obtained from the device(s) of the victim may still provide useful information to the responding entity. For example, consider that the person is wearing a fitness watch and/or other wearable device that is capable of communicating data. Various information (e.g., medical vitals) or the like of the victim can then be determined without communicating directly with the victim, only device(s) associated therewith.

Using the established communication connection, the responder 112 also may use the emergency response app 116 via the emergency communication server 102 to request other data that may be available from the user's device 108. For instance, the user's device may have the capability to monitor biometrics of the user to show real-time vital signs. The responder 112 may make a request via voice or other means to retrieve, from the emergency communication app 110, the vital sign data as provided by the user's device 108 or another device. The retrieved data may be presented for augmented reality display, e.g., as shown via the updated overlay 990 in FIG. 9.

Further, a summary of any communications may be captured and displayed with time data, based on communication timestamps. Any content of communications between the responder 112 and the victim that were communicated between the emergency response app 116 and the emergency communication app 110 can be analyzed by the emergency communications server 102. The analysis of the content of the communications may be used to present a summary of points of significance between the two parties during the communication. For instance, as shown via the updated overlay 1010 in FIG. 10, the analysis may pull out significant vital sign changes, trending conditions, statements by the victim, non-responsiveness by the victim, and/or other events. These data may be recorded in an ongoing log or the like that may be accessible and viewable by the responder 112 and/or by other parties, e.g., medical personnel at a hospital.

Figure 11:
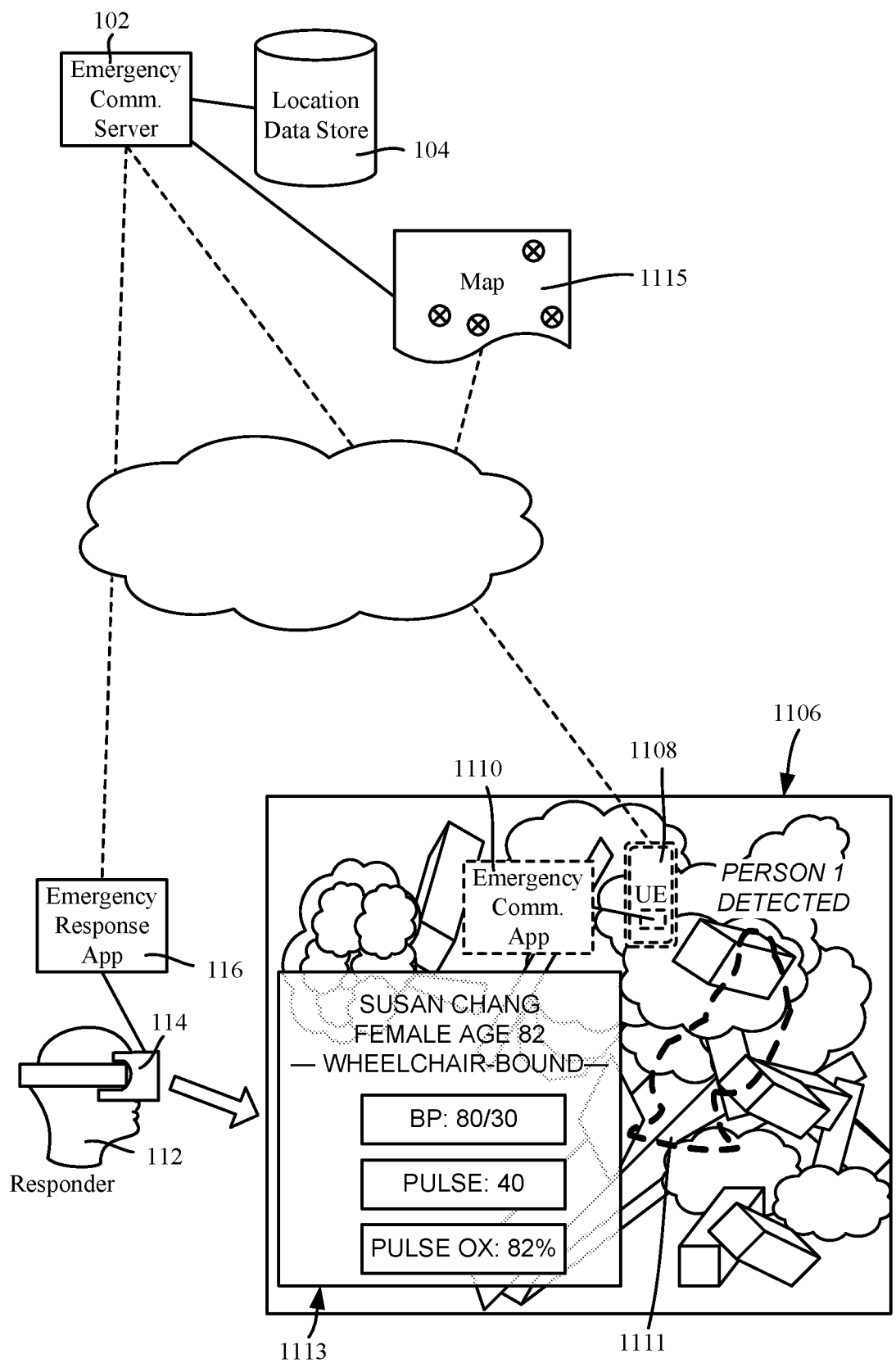
FIG. 11 is an example representation of a responder communicating with communication device(s) of an unseen victim, in accordance with various aspects and embodiments of the subject disclosure.

In another embodiment as generally represented in the view 1106 of FIG. 11, a victim may not be clearly visible. For example, a building collapse resulting from an earthquake may result in victims who are not visible to responders due to rubble or other obstructions. In this case, a similar method may be used to identify the location of a user device 1108 within the proximity of the viewed obstruction. The responder 112 may use the same method to view the obstruction and identify the device's location. The process for determining any devices may then include a detection of devices whose location was registered within a range of coordinates from the location of the observed obstruction. Using this approach, the responder may be able to communicate with an unseen victim (represented in FIG. 11 by the outline 1111) and/or receive their biometrics and other data (block 1113), even if he or she is non-responsive.

If multiple devices are detected in a range/zone, the server 102 or emergency response application 116 may generate a map 1115 for presentation, e.g., showing each device's location on the map, (each device represented by a crossed circle within the map 1115). As described herein, the locations of such devices are respective candidate locations for respective persons. Note that an instance of the emergency communications application program need not be installed or running on a device to know the device's location, and indeed, a network of devices based on any communications from the devices can be used to map candidate locations of persons.

Figure 12:
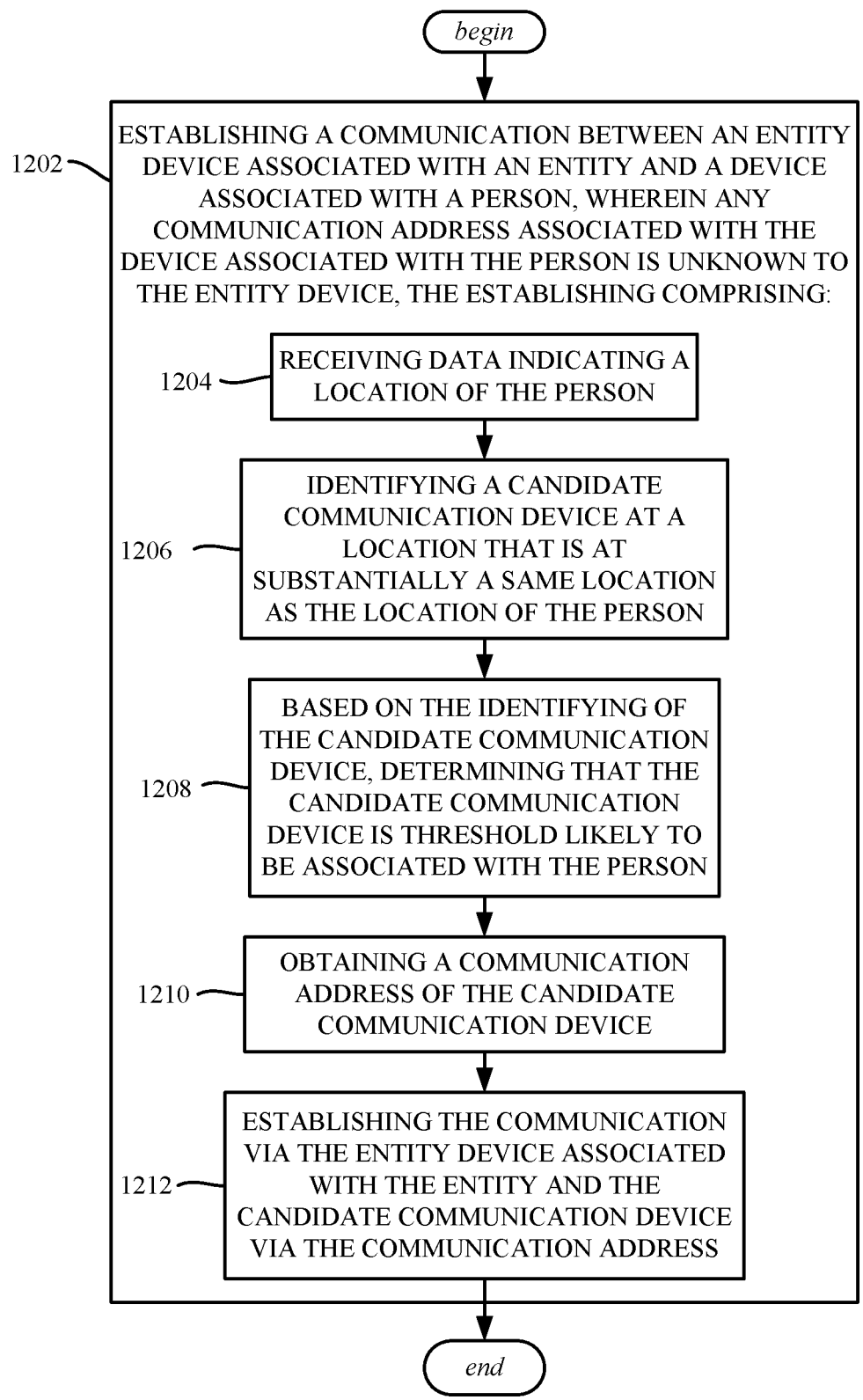
FIG. 12 is a flow diagram representing example operations related to establishing a communication between an entity and a device associated with a person, in which the communication address associated with the person's device is unknown to the entity device, in accordance with various aspects and embodiments of the subject disclosure.

One or more example aspects are represented in FIG. 12, and can correspond to a system, including a processor, and a memory that stores executable instructions that, when executed by the processor, facilitate performance of operations. Example operation 1202 represents establishing a communication between an entity device associated with an entity and a device associated with a person, wherein any communication address associated with the device associated with the person is unknown to the entity device; establishing includes operations 1204-1212. Example operation 1204 represents receiving data indicating a location of the person. Example operation 1206 represents identifying a candidate communication device at a location that is at substantially a same location as the location of the person. Example operation 1208 represents based on the identifying of the candidate communication device, determining that the candidate communication device is threshold likely to be associated with the person. Example operation 1210 represents obtaining a communication address of the candidate communication device. Example operation 1212 represents establishing the communication via the entity device associated with the entity and the candidate communication device via the communication address.

The entity can include a responder entity, and wherein the responder entity comprises at least one of a human responder, or an automated responder.

Receiving the data indicating the location of the person can include obtaining an image using a viewing device, and detecting the person within the image.

Receiving the data indicating the location of the person can include detecting the candidate communication device, and wherein the identifying the candidate communication device at the location that is at substantially the same location as the location of the person can include identifying the candidate communication device at the location that is at the same location as the location of the person.

Receiving the data indicating the location of the person can include receiving zone data representing a zone proximate to the candidate communication device.

Receiving the data indicating the location of the person can include obtaining statistical data, and based on the statistical data, predicting, to a defined probability level, that the person is at the location.

Further operations can include obtaining user information of the person via the candidate communication device, and presenting an extended reality display based on the user information.

Further operations can include presenting an extended reality display of data describing a summary of messaging of past communications between the entity device and the candidate communication device associated with the person.

Further operations can include presenting an extended reality display of data obtained from user input to the candidate communication device from the person in response to a spoken request from the entity relayed to the candidate communication device via the entity device.

The person can be a first person, the location can be first location, the candidate communication device can include a first candidate communication device, the communication address can include a first communication address, and further operations can include receiving second data indicating a second location of a second person, any communication address associated with the second person can be unknown to the entity device, identifying a second candidate communication device at substantially a same location, or the same location, as the second location, based on the identifying of the second candidate communication device, determining that the second candidate communication device is threshold likely to be associated with the second person, obtaining a second communication address of the second candidate communication device, and generating a map for presentation, via at least one of entity device, the first candidate communication device, or the second candidate communication device using the map, of the first location of the first person and the second location of the second person.

Figure 13:
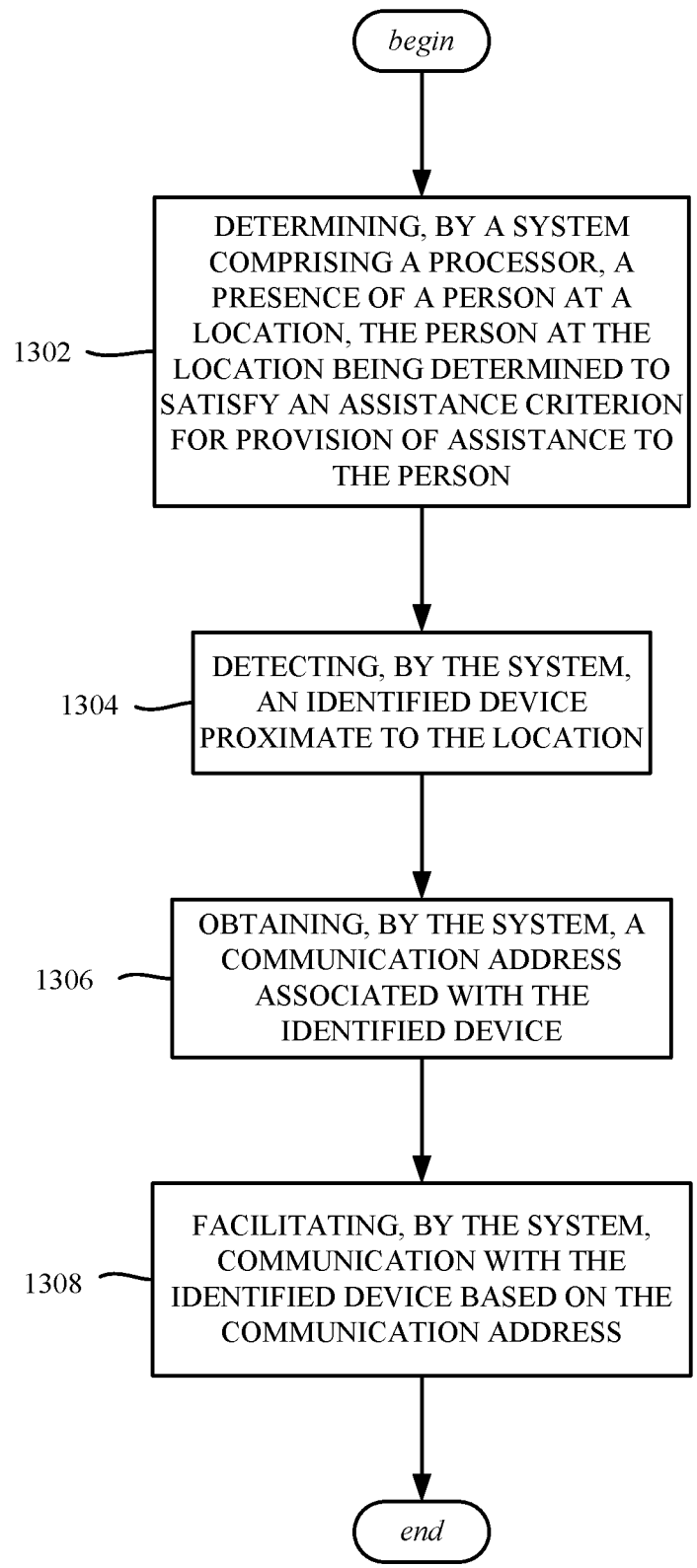
FIG. 13 is a flow diagram representing example operations related to facilitating communication with a device based on detecting a device communication address of a device proximate a person's presence at a location, in accordance with various aspects and embodiments of the subject disclosure.

One or more example aspects are represented in FIG. 13, and, for example, can correspond to operations, such as of a method. Example operation 1302 represents determining, by a system comprising a processor, a presence of a person at a location, the person at the location being determined to satisfy an assistance criterion for provision of assistance to the person. Example operation 1304 represents detecting, by the system, an identified device proximate to the location. Example operation 1306 represents obtaining, by the system, a communication address associated with the identified device. Example operation 1308 represents facilitating, by the system, communication with the identified device based on the communication address.

Facilitating of the communication can include at least one of: placing a call, on behalf of a responder, by the system to the identified device directed to the person, or sending a message, by the system, to the identified device directed to the person.

Further operations can include presenting, by the system, a summary of messages of the communication between the system, on behalf of the responder, and the identified device associated with the person.

Presenting of the summary of the messages of the communication can include analyzing the messages of the communication for at least one of: biological state change data describing a biological state change applicable to the person, statement data describing statements obtained from the person, or non-responsiveness data describing a non-responsiveness of the person to any messages from the system, on behalf of the responder.

Further operations can include obtaining, by the system, user information associated with the person via the candidate communication device, and presenting, by the system, an extended reality display based on the user information.

Presenting the extended reality display of data can occur in response to a request for the presenting from the responder.

The person may not currently be visible to an image sensor, and determining of the presence of the person can be based on detecting the identified device proximate to the location.

Further operations can include generating, by the system, map data representing an estimated zone comprising the location corresponding to the person.

Figure 14:
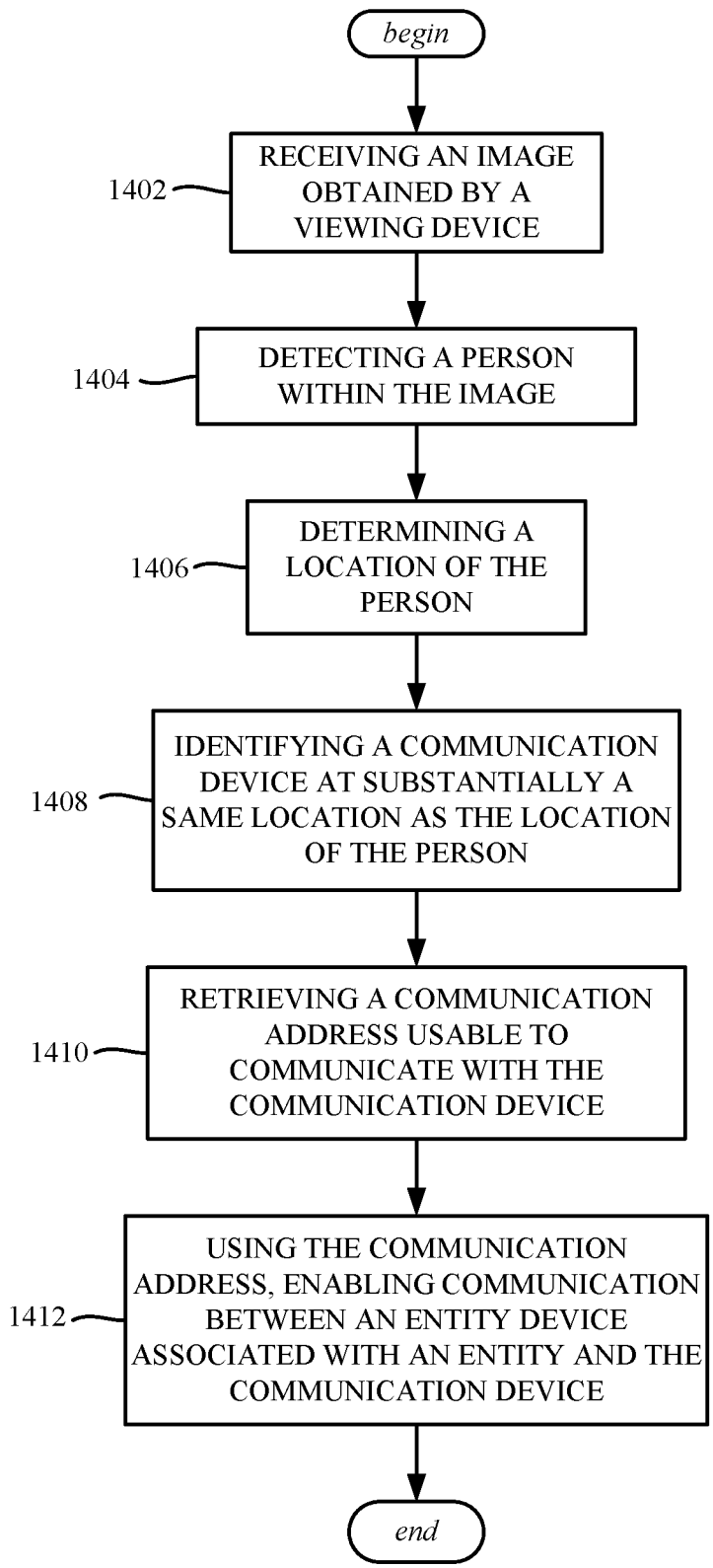
FIG. 14 is a flow diagram representing example operations related identifying a communication device at substantially a same location as a person and retrieving a communication address to communicate via the communication device, in accordance with various aspects and embodiments of the subject disclosure.

One or more aspects are represented in FIG. 14, such as implemented in a machine-readable medium, including executable instructions that, when executed by a processor, facilitate performance of operations. Example operation 1402 represents receiving an image obtained by a viewing device. Example operation 1404 represents detecting a person within the image. Example operation 1406 represents determining a location of the person. Example operation 1408 represents identifying a communication device at substantially a same location as the location of the person. Example operation 1410 represents retrieving a communication address usable to communicate with the communication device. Example operation 1412 represents using the communication address, enabling communication between an entity device associated with an entity and the communication device.

Further operations can include presenting a view to the entity, via the entity device, corresponding to image data obtained via the viewing device, obtaining user information associated with the person from the communications device, and augmenting the view based on the user information.

As can be seen, the technology described herein facilitates an adequate way for an entity (e.g., a responder) to initiate and conduct a communication with another person or his or her device when generally located but inaccessible, and without a priori knowing the communication address of the communication device or the person's identity. By matching the person's location or likely location to a candidate device's registered location, the communication address of the device obtained. This facilitates communications and obtaining information regarding a person, as well as (often) providing a basis for identifying the person, which in turn can be used to obtain additional data of the person.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 15:
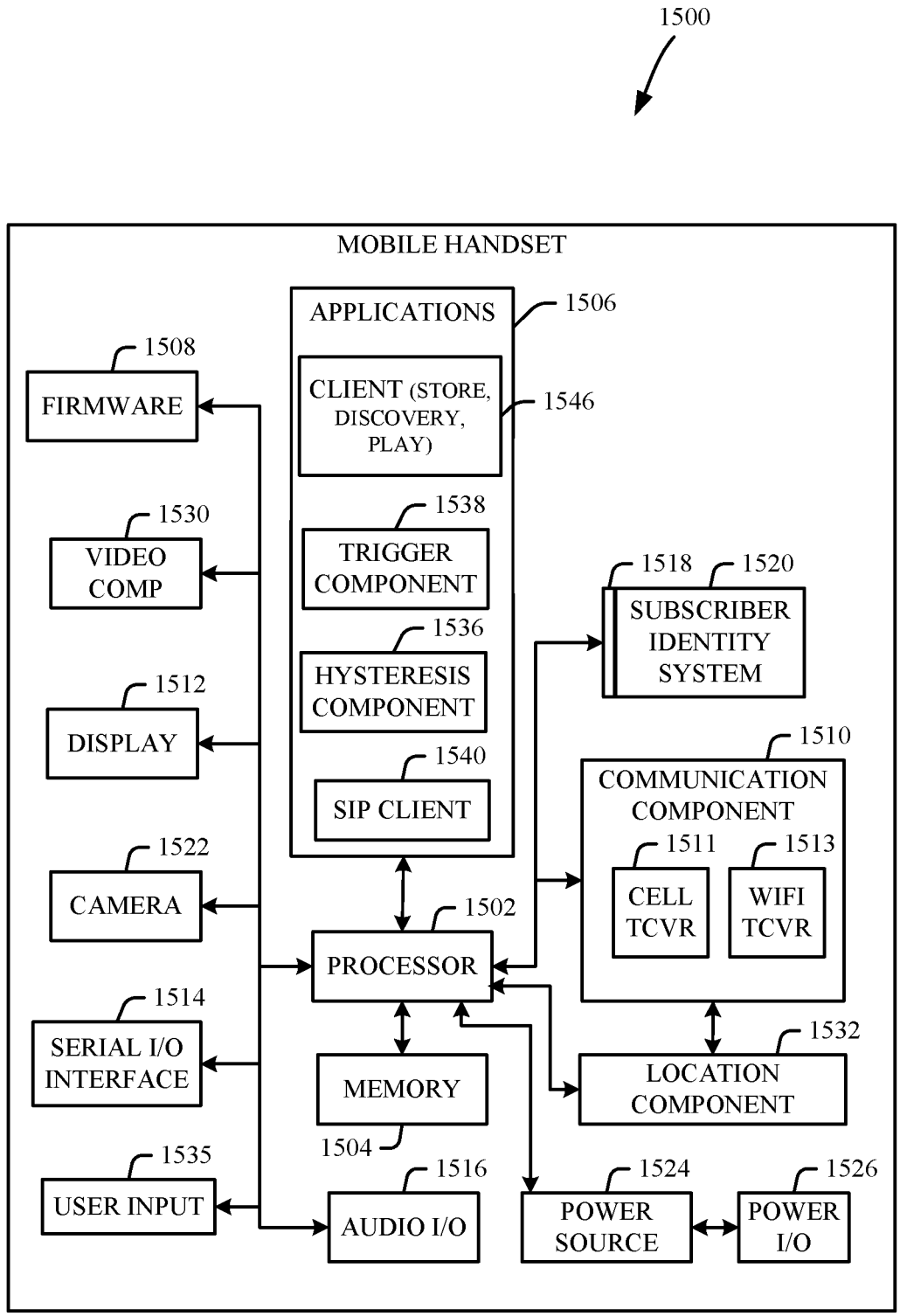
FIG. 15 illustrates an example block diagram of an example mobile handset operable to engage in a system architecture that facilitates wireless communications according to one or more embodiments described herein.

Referring now to FIG. 15, illustrated is a schematic block diagram of an example end-user device (such as user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hard-wire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
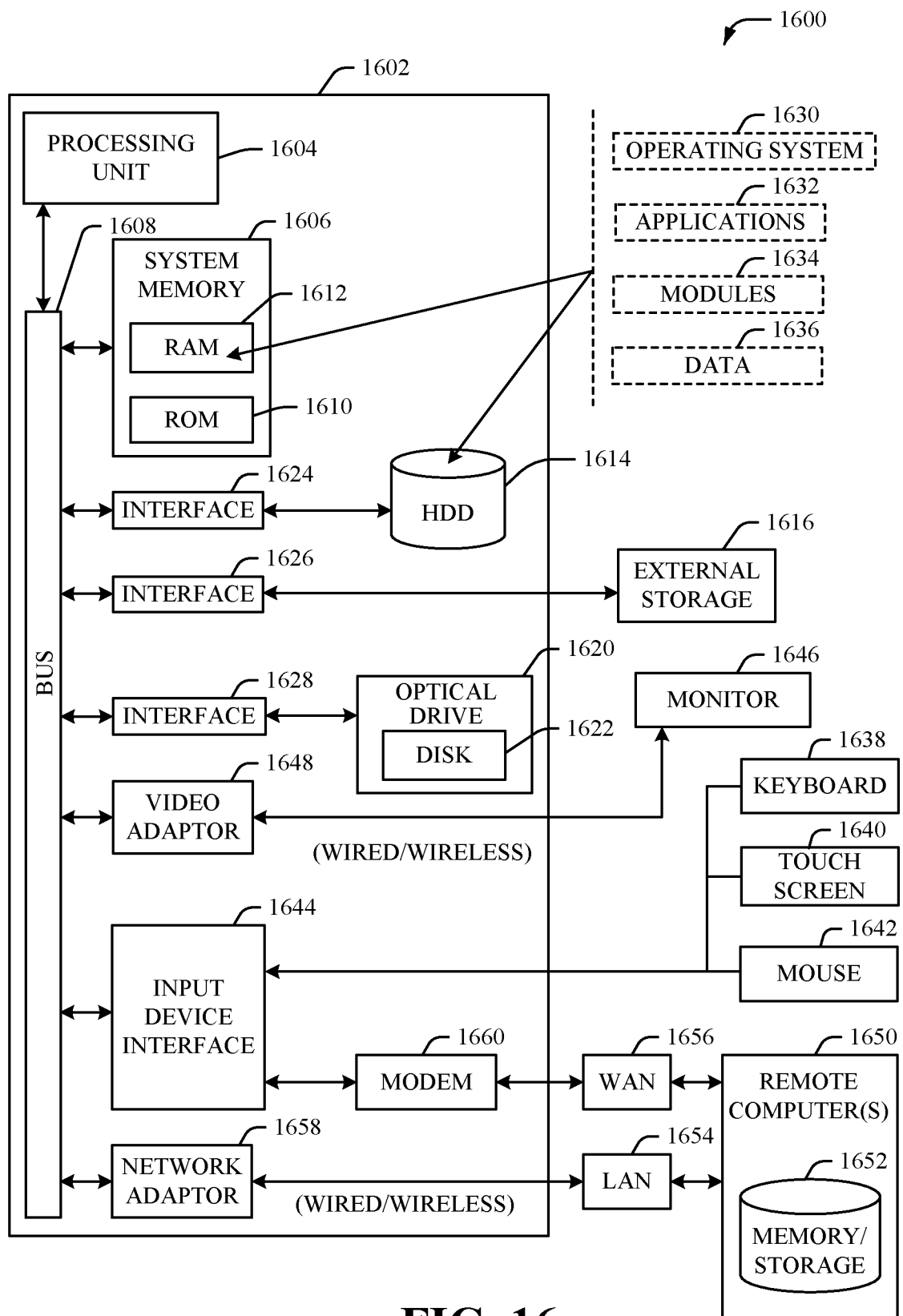
FIG. 16 illustrates an example block diagram of an example computer/machine system operable to engage in a system architecture that facilitates wireless communications according to one or more embodiments described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD), non-volatile memory and other storage technology could be used in addition to, or in place of, an HDD 1614, and can be internal or external. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally include emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can include one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 16 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        establishing a communication between an entity device associated with an entity and a device associated with a person in connection with an emergency event, wherein any communication address associated with the device associated with the person is unknown to the entity device, the establishing comprising:
            receiving data indicating a location of the person;
            once the location of the person is known, identifying a candidate communication device that has registered at the location of the person or is at substantially same location coordinates as the location of the person based on predetermined match criteria, wherein the predetermined match criteria define a candidate location around the same location coordinates and the candidate location varies depending on a nature of the emergency event by expanding or narrowing the candidate location;
            based on the identifying of the candidate communication device, determining that the candidate communication device is associated with the person to be directly communicating with the person via the candidate communication device;
            obtaining a communication address of the candidate communication device; and
            establishing the communication via the entity device associated with the entity and the candidate communication device via the communication address, wherein data connection is made between the entity device and the candidate communication device to exchange audio data, video data, biometric data or a combination thereof to respond to the emergency event.

2. The system of claim 1, wherein the entity comprises a responder entity, and wherein the responder entity comprises at least one of a human responder, or an automated responder.

3. The system of claim 1, wherein the receiving of the data indicating the location of the person comprises obtaining an image using a viewing device, and detecting the person within the image.

4. The system of claim 1, wherein the identifying the candidate communication device further comprises determining that a timestamp for the registration of the location of the candidate communication device in a location database matches with a time of the emergency event.

5. The system of claim 1, wherein the receiving of the data indicating the location of the person comprises receiving zone data representing a zone proximate to the candidate communication device.

6. The system of claim 1, wherein the receiving of the data indicating the location of the person comprises obtaining statistical data, and based on the statistical data, predicting, to a defined probability level, that the person is at the location.

7. The system of claim 1, wherein the operations further comprise obtaining user information of the person via the candidate communication device, and presenting an extended reality display based on the user information.

8. The system of claim 1, wherein the operations further comprise presenting an extended reality display of data describing a summary of messaging of past communications between the entity device and the candidate communication device associated with the person.

9. The system of claim 8, wherein the operations further comprise presenting an extended reality display of data obtained from user input to the candidate communication device in response to a spoken request from the entity relayed to the candidate communication device via the entity device.

10. The system of claim 1, wherein the person is a first person, wherein the location is a first location, wherein the candidate communication device is a first candidate communication device, wherein the communication address comprises a first communication address, and wherein the operations further comprise:
    receiving second data indicating a second location of a second person, wherein any communication address associated with the second person is unknown to the entity device;
    identifying a second candidate communication device at substantially a same location, or the same location, as the second location;

based on the identifying of the second candidate communication device, determining that the second candidate communication device is associated with the second person;

obtaining a second communication address of the second candidate communication device; and generating a map for presentation, via at least one of entity device, the first candidate communication device, or the second candidate communication device using the map, of the first location of the first person and the second location of the second person.

11. A method, comprising:

determining, by a system comprising a processor, a presence of a person at a location, the person at the location being determined to satisfy an assistance criterion for provision of assistance to the person in an emergency event;

receiving, by the system, data indicating the location of the person;

once the location of the person is known, detecting, by the system, a candidate communication device proximate to the location based on predetermined match criteria, wherein the predetermined match criteria define a candidate location around a same location of the person and the candidate location varies depending on a nature of the emergency event by expanding or narrowing the candidate location;

based on the detection of the candidate communication device, determining, by the system, that the candidate communication device is associated with the person to be directly communicating with the person via the candidate communication device;

obtaining, by the system, a communication address associated with the candidate communication device; and facilitating, by the system, communication with the candidate communication device based on the communication address, wherein data connection is made with the candidate communication device to exchange audio data, video data, biometric data or a combination thereof to respond to the emergency event.

12. The method of claim 11, wherein the facilitating of the communication comprises at least one of: placing a call, on behalf of a responder, by the system to the candidate communication device directed to the person, or sending a message, by the system, to the candidate communication device directed to the person.

13. The method of claim 12, further comprising presenting, by the system, a summary of messages of the communication between the system, on behalf of the responder, and the candidate communication device associated with the person.

14. The method of claim 13, wherein the presenting of the summary of the messages of the communication comprises analyzing the messages of the communication for at least one of: biological state change data describing a biological state change applicable to the person, statement data describing statements obtained from the person, or non-responsiveness data describing a non-responsiveness of the person to any messages from the system, on behalf of the responder.

15. The method of claim 11, further comprising obtaining, by the system, user information associated with the person via the candidate communication device, and presenting, by the system, an extended reality display based on the user information.

16. The method of claim 15, wherein the presenting of the extended reality display of data occurs in response to a request for the presenting from a responder.

17. The method of claim 11, wherein the determining of the presence of the person is based on the detecting of the candidate communication device proximate to the location, regardless of whether the person is currently visible to an image sensor worn by a responder or not.

18. The method of claim 17, further comprising generating, by the system, map data representing an estimated zone comprising the location corresponding to the person.

19. A non-transitory machine-readable medium, comprising executable instructions that, when executed by a processor, facilitate performance of operations, the operations comprising:

receiving an image obtained by a viewing device worn by a responder;

detecting a person within the image in connection with an emergency event;

determining a location of the person;

identifying a candidate communication device that has registered at the location of the person or at substantially same location coordinates as the location of the person based on predetermined match criteria, wherein the predetermined match criteria define a candidate location around the same location coordinates, and the candidate location varies depending on a nature of the emergency event by expanding or narrowing the candidate location;

based on the identifying of the candidate communication device, determining that the candidate communication device is associated with the person to be directly communicating with the person via the candidate communication device;

retrieving a communication address usable to communicate with the candidate communication device; and using the communication address, enabling communication between an entity device associated with the responder and the candidate communication device wherein data connection is made between the entity device and the candidate communication device to exchange audio data, video data, biometric data or a combination thereof to respond to the emergency event.

20. The non-transitory machine-readable medium of claim 19, wherein the operations further comprise:

presenting a view to the responder, via the entity device, corresponding to image data obtained via the viewing device, obtaining user information associated with the person from the candidate communications device, and augmenting the view based on the user information.

* * * * *